United States Patent
Luu et al.

(10) Patent No.: US 7,024,549 B1
(45) Date of Patent: Apr. 4, 2006

(54) DISK DRIVE HAVING A PROTECTED PARTITION CONFIGURED TO LOAD AN OPERATING SYSTEM FOR PERFORMING A USER-SELECTED FUNCTION

(75) Inventors: Vu V. Luu, Milpitas, CA (US); Stephen T Havert, Lake Forest, CA (US); Matthew W. Milne, Chino, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 459 days.

(21) Appl. No.: 09/920,575

(22) Filed: Jul. 31, 2001

(51) Int. Cl.
*G06F 9/44* (2006.01)

(52) U.S. Cl. ............................... 713/2; 713/1; 713/100

(58) Field of Classification Search .................... 713/1, 713/2, 100
See application file for complete search history.

(56) References Cited

U.S. PATENT DOCUMENTS 5,966,732 A * 10/1999 Assaf ......................... 711/170
6,178,503 B1 * 1/2001 Madden et al. ................ 713/2
6,367,074 B1 * 4/2002 Bates et al. .................. 711/170
6,385,721 B1 * 5/2002 Puckette ......................... 713/2
6,542,979 B1 * 4/2003 Eckardt ....................... 711/173

* cited by examiner

*Primary Examiner*—Lynne H. Browne
*Assistant Examiner*—Tse Chen
(74) *Attorney, Agent, or Firm*—Jason T. Evans, Esq.; Howard H. Sheerin, Esq.

(57) ABSTRACT

A system for configuring, loading and executing an operating system for performing a user-selected function is disclosed. The system includes a disk drive including: a host-accessible user partition; a host-inaccessible hidden partition independent of the host-accessible user partition; and a disk controller. The user partition includes: a user partition address range; a host-selected operating system; and a host-selected master boot record. The host-inaccessible hidden partition includes: a hidden partition address range outside the user partition address range; an application program for allowing a user to select a function to perform and configuring, loading and executing an operating system to perform the selected function; and a drive-selected boot record for loading and executing the application program that allows the user to select a function and configures, loads and executes an operating system for performing the function.

8 Claims, 5 Drawing Sheets

DISK DRIVE HAVING A PROTECTED PARTITION CONFIGURED TO LOAD AN OPERATING SYSTEM FOR PERFORMING A USER-SELECTED FUNCTION

BACKGROUND OF THE INVENTION

1. Field of the Invention

The present invention relates generally to digital information storage, and more particularly to a computer system and disk drive for using a host-inaccessible hidden partition to load an operating system for performing a user-selected function.

2. Description of the Prior Art

Often a user turns on his or her computer for a very specific purpose. For example, the user may want to check e-mail, surf the Internet or write a letter. After the desired task is completed, the user shuts off the computer. In a typical computer system, the same operating system is loaded regardless of the task being performed.

Some systems allow a user to load a selected operating system. For example, a user can load different operating systems on different partitions and change the active partition so that on the next boot-up, the operating system in the new active partition will be loaded and executed. This can be cumbersome and time consuming. To alleviate this problem, application programs, such as System Commander® developed by VCOM Products displays a list of available operating systems when the user starts his computer. The user then selects the operating system to be loaded. These application programs load the "complete" operating system regardless of what functions of the operating system the user intends to use. This consumes more time that may be necessary in order to perform the desired task(s).

Thus, a need exists for a system that allows an operating system to be configured, loaded and executed based on the function(s) to be performed by the user.

SUMMARY OF THE INVENTION

One embodiment of the invention comprises a disk drive for use with a computer system configured to generate a command. The disk drive comprises: a host-accessible user partition; a host-inaccessible hidden partition independent of the host-accessible user partition; and a disk controller. The host-accessible user partition includes: a user partition address range; a host-selected operating system stored within the user partition address range; and a host-selected master boot record stored within the user partition address range, the host selected master boot record identifying the host-selected operating system. The host-inaccessible hidden partition includes: a hidden partition address range outside the user partition address range; a drive-selected boot record stored within the hidden partition address range, the drive-selected boot record configured to load an instruction set capable of executing an application program having a user interface for accepting a user selection identifying the user-selectable function to be performed, to execute the application program, to accept the user selection identifying the user-selectable function to be performed, and to load an operating system configured to perform the user-selectable function; and at least one drive-selected operating system configurable to perform at least one user-selectable function. The disk controller is configured to receive the command from the computer system and to send the drive-selected boot record to the computer system in response to receipt of the command.

Another embodiment of the invention comprises a computer system including: a disk drive and a host computer coupled to the disk drive. The disk drive includes: a host-accessible user partition; and a host-inaccessible hidden partition independent of the host-accessible user partition. The host-accessible user-partition includes: a user partition address range; a host-selected operating system stored within the user partition address range; and a host-selected master boot record stored within the user partition address range, the host-selected master boot record identifying the host-selected operating system. The host-inaccessible hidden partition includes: a hidden partition address range outside the user partition address range; and a drive-selected boot record stored within the hidden partition address range. The host computer includes: a host processor; and a host memory. The host processor is configured to generate a command to read the host-selected master boot record. The host memory is configured to load the drive-selected boot record to define a loaded drive-selected boot record, after the disk drive receives the command. The host processor is configured to execute the loaded drive-selected boot record, the drive-selected boot record is configured to load an instruction set capable of executing an application program having a user interface for accepting a user selection identifying the user-selectable function to be performed, to execute the application program, to accept the user selection identifying the user-selectable function to be performed, and to load an operating system configured to perform the user-selectable function.

BRIEF DESCRIPTION OF THE DRAWINGS

The accompanying drawings illustrate embodiments of the present invention, and, together with the description, serve to explain the principles of the invention.

DESCRIPTION OF THE PREFERRED EMBODIMENTS

Figure 1:
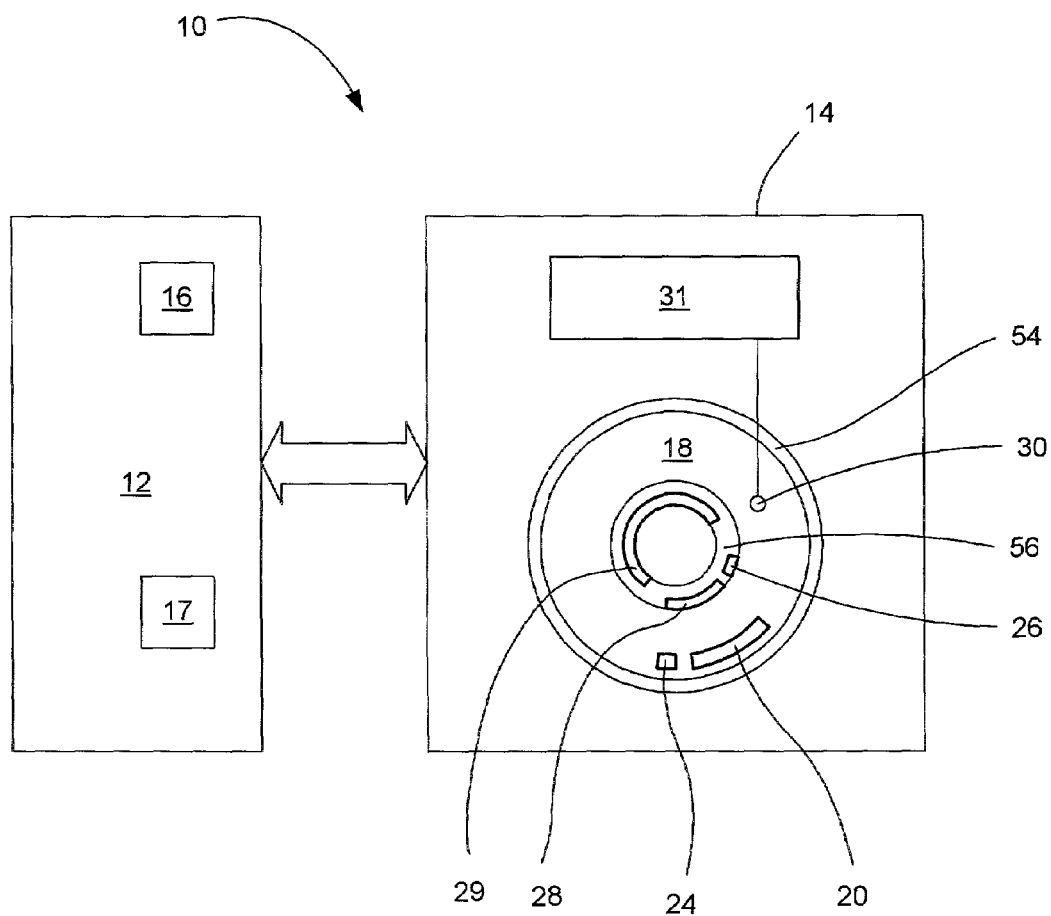
FIG. 1 is a diagram of a computer system, having a host computer coupled to a disk drive having a hidden partition for storing an application program configured to configure, load and execute an operating system based on a user-selected function.

U.S. patent application Ser. No. 09/796,915, filed Feb. 28, 2001, titled "COMPUTER SYSTEM AND METHOD FOR ACCESSING A PROTECTED PARTITION OF A DISK DRIVE THAT LIES BEYOND A LIMITED ADDRESS RANGE OF A HOST COMPUTER," the entire contents of which are incorporated herein by reference, discloses a computer system having a host computer coupled to a disk drive having a user partition and a hidden partition and a system and method for accessing the hidden partition. As shown in the drawings and explained in further detail herein, the present invention stores an application program 29 in the hidden partition 56. The application program 29 displays a user interface 200 that allows the user to select a function to be performed. The application program 29 then loads an operating system configured to perform the user-selected function.

Figure 2:
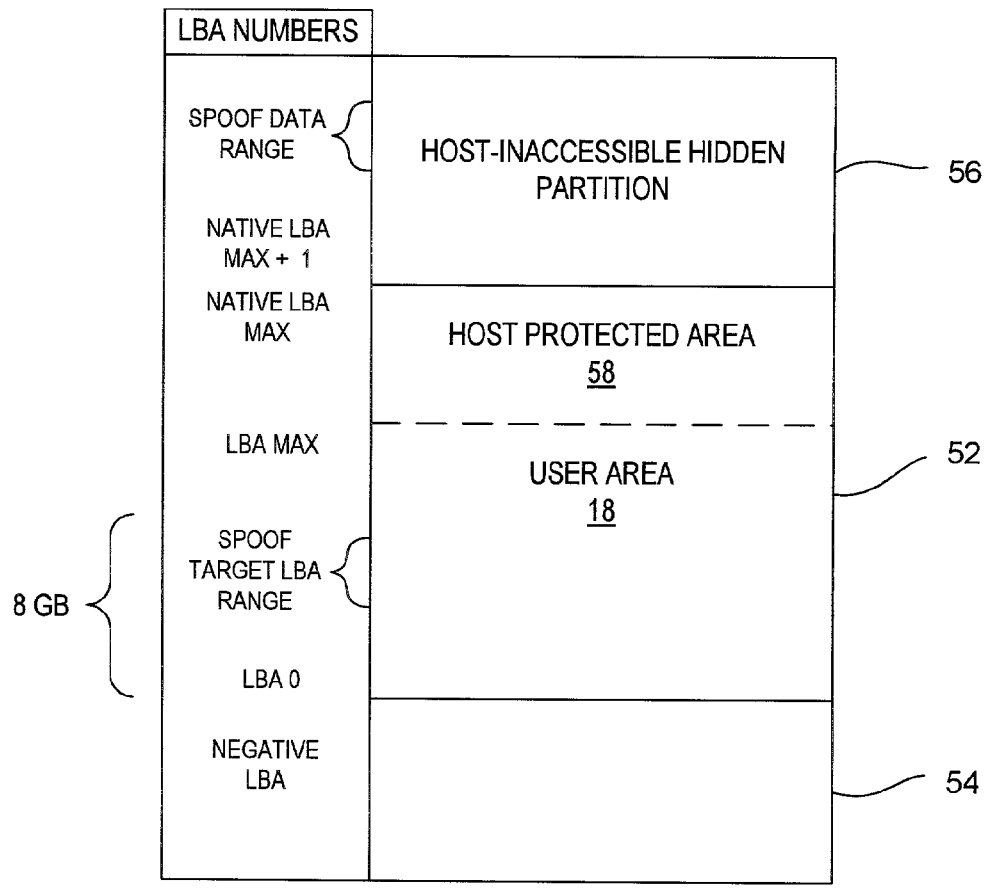
FIG. 2 is a diagram illustrating the organization of data storage sectors in the disk drive of FIG. 1.
Figure 3:
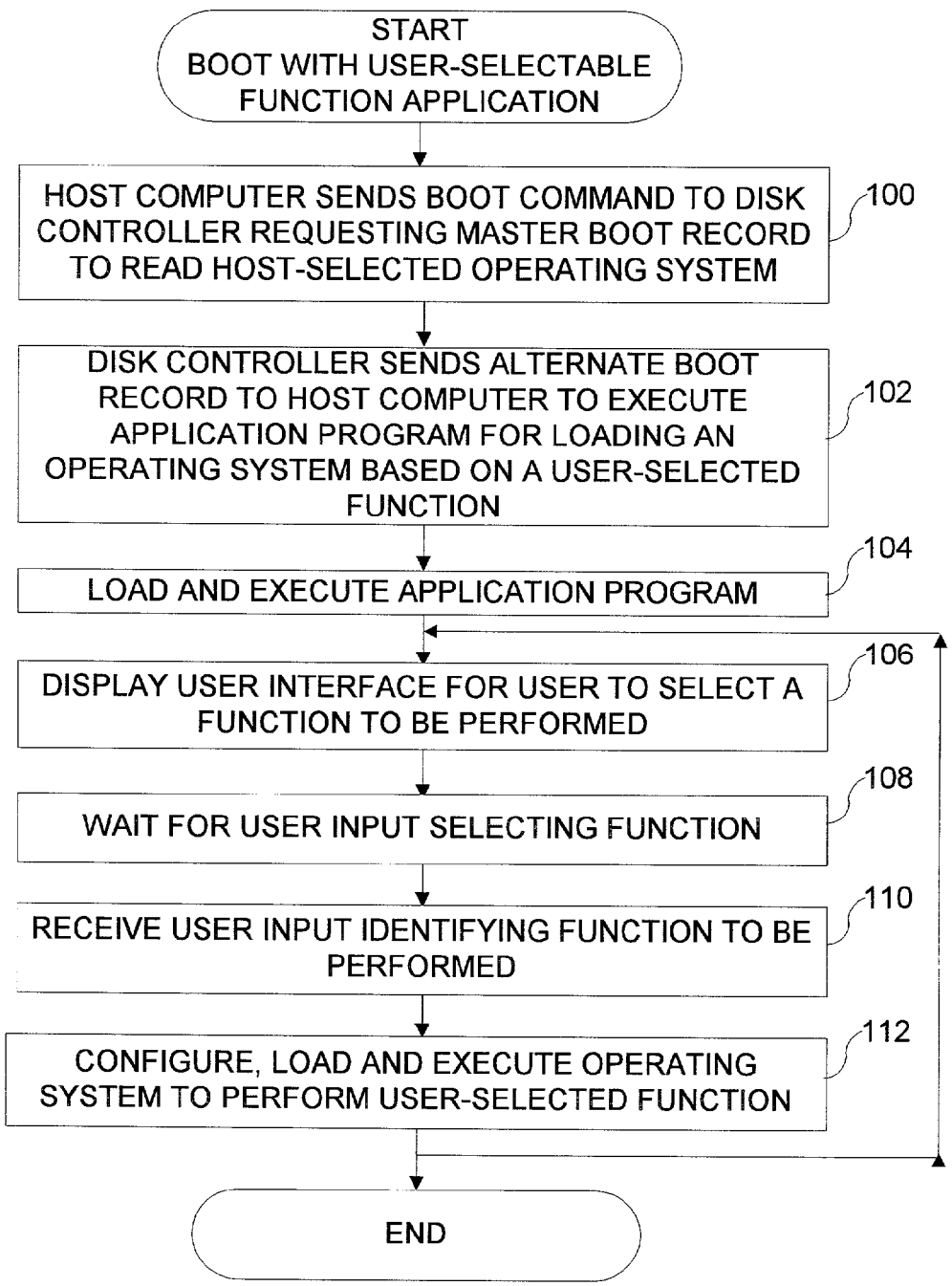
FIG. 3 is a flow diagram illustrating exemplary logic for executing an application program that configures, loads and executes an operating system based on a user-selected function.

The present invention may be embodied in a computer system (FIG. 1) and a related method (FIG. 3). The computer system 10 includes a host computer 12 and a disk drive 14. The host computer 12 has a host processor 16 and a host memory 17. It will be appreciated that the host computer may also include peripheral devices, such as a keyboard (not shown), mouse (not shown), display (not shown) and printer (not shown). The disk media of the disk drive 14 is accessed using a head assembly 30 and may be divided into data storage sectors, each generally storing 512 data bytes. Each sector may be addressed using a logical block address (LBA). A linear addressing scheme using the LBAs for addressing the sectors is shown in FIG. 2. The data storage sectors are organized into a host-accessible user partition 52, a drive management partition 54, and a protected area also referred to herein as a disk-drive selected application partition (DDSAP) or a host-inaccessible hidden partition 56. The user partition 52 includes a user area 18 and may be assigned to LBA numbers 0 through a native maximum (MAX) LBA. The host computer 12 may access the data storage sectors in the user partition 52 using an industry standard interface protocol, such as the ATA Interface between host computers and storage devices. The ATA standard also defines a host protected area 58 within the user partition 52 for data storage outside the normal file system of the user's preferred operating system 20. Typically, the operating system cannot change data in the host-protected area 58. A host-selected master boot record (MBR) 24 includes a small program for loading and executing the user's preferred or host-selected operating system 20. The host-protected area 58 is intended for use only by the host computer's basic input/output system (BIOS) or other low-level boot time process when the storage device is initially configured.

The drive management partition 54 may be assigned to negative LBA numbers and the corresponding data storage sectors may be accessed using drive management commands. The data in the drive management partition 54 generally includes disk drive configuration and physical format information written by the disk-drive manufacturer during initial testing and configuration of the disk drive 14. The drive management commands generally vary from manufacturer to manufacturer.

DDSAP 56 is assigned to "spare" data storage sectors above the native MAX LBA number. It will be appreciated that the DDSAP could be assigned to negative LBA numbers instead of or in addition to storage sectors above the native MAX LBA number. Generally, the disk drive manufacturer configures the DDSAP before shipment of the disk drive 14. The DDSAP sectors are visible to the disk drive's microprocessor-based internal disk controller 31 (FIG. 1) but normally are not visible to the host computer 12. Accordingly, data stored in the DDSAP may not be destroyed by logical partitioning and formatting processes (e.g., FDISK) performed on the user partition 52. The DDSAP includes at least one drive-selected boot record 26, at least one extended disk access routine 28 and at least one interrupt routine or application 29. In the present invention, the DDSAP delivered by the disk drive manufacturer includes an application 29 for displaying a user interface configured to allow a user to select a function to perform, waiting for a user input selecting a function to perform, and loading an operating system configured to perform the selected function. A drive-selected boot record 26 causes the logic to execute the application program 29.

FIG. 3 is a flow diagram illustrating exemplary logic for configuring and loading an operating system based on a user-selected function. The logic moves from a start block to block 100 where the host computer 12 sends a boot command to the disk controller 31 requesting a boot record to read the host-selected operating system 20. This is the normal or typical boot procedure. Normally, the disk controller 31 sends the master boot record identifying the host-selected operating system 20. Typically, there is an MBR located at cylinder 0, head 0, sector 1 of a hard disk. The MBR is first of what could be many partition sectors, each containing a partition table. The MBR contains a small program that attempts to locate an active (bootable) partition in its partition table. Each operating system has its own boot sector format. The small program in the boot sector locates the first part of the operating system's loader program, or a boot manager program. The located first part of the operating system's loader program (or a boot manager program) is then read into host memory 17. In other words, the host-selected or user preferred operating system 20 is loaded and executed. However, in the present invention, the disk controller 31 uses address spoofing as described in U.S. patent application Ser. No. 09/796,915 to send an alternate boot record that allows the user to run the application program 29 in the hidden partition 56 that configures, loads and executes an operating system based on a user-selected function. See block 102. Next, the logic moves to block 104 where the host computer 12 loads and executes the application program 29 as per instructions in the alternate boot record. Next, in block 106, the application program 29 displays a user interface that allows the user to select a function to be performed.

Figure 4:
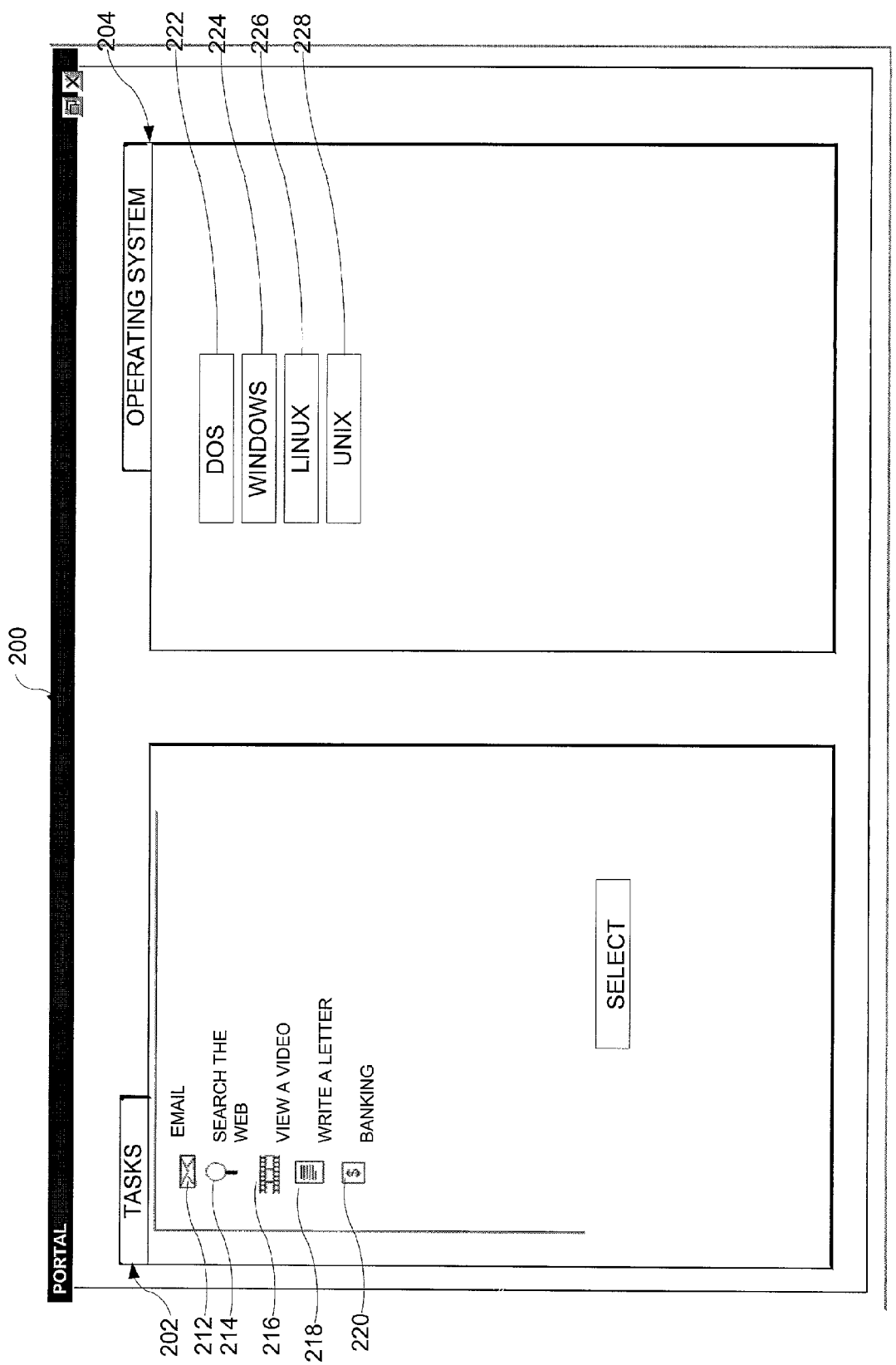
FIG. 4 is an exemplary user interface for allowing a user to select a function to be performed.

An exemplary user interface 200 for a user to select a function is shown in FIG. 4. In the exemplary user interface 200, the user can select a function or task from a task list 202. In the exemplary user interface shown in FIG. 4, there are controls (e.g., buttons) that allow the user to select a function to perform. In the illustrated example, the user can select to perform a task or function, for example, accessing e-mail 212, searching the Web 214, viewing a video 216, writing a letter 218 or performing banking functions 220. In the example illustrated, selection of a function causes an operating system, such as Windows® to be configured and loaded. Preferably, those portions of the operating system (e.g., Windows®) that are needed to perform the function are loaded. After the operating system is configured, loaded and executed, an application, such as Microsoft® Word® or Microsoft® Excel® may be executed so that the user-selected function can be performed.

In exemplary embodiments the user can select an operating system as the function to be performed instead of selecting a specific task from the task list as the function to be performed. In the example shown in FIG. 4, the user can select an operating system from an operating system list 204. Selecting an operating system from the operating system list 204 will cause the "complete" operating system to be loaded. In the exemplary embodiment, the user can press a button to load DOS 222, Windows 224, Linux 226 or Unix 228.

Referring to FIG. 3, the logic proceeds to block 108 to wait for the user to select a function. The logic then moves to block 110 where the user input is received. After the user input is received, the logic moves to block 112 where an operating system is configured, loaded and executed in order to perform the user-selected function. As described above, an appropriate operating system is configured based on the selected function to be performed. The operating system may be configured so that a minimal function set required to perform the function is loaded. The selected operating system may reside in the hidden partition 56 or the user partition 52.

Figure 5:
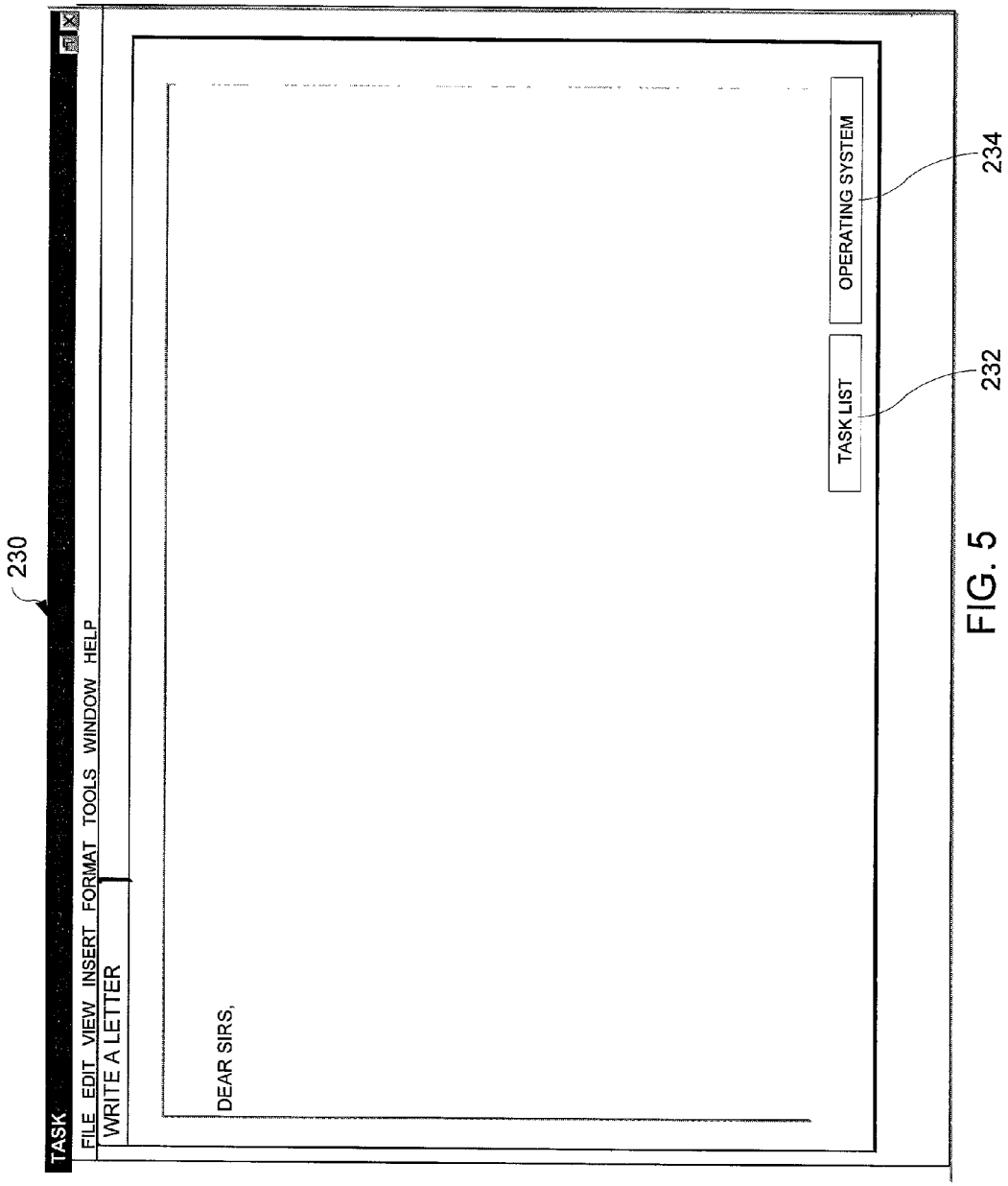
FIG. 5 is an exemplary user interface displayed after an operating system has been configured, loaded and executed to perform a user-selected function.

In exemplary embodiments, such as the one shown in FIG. 5, the user can easily re-display the desired list (e.g., task list 202 or operating system list 204) for selecting a user-selectable function after the appropriate operating system has been configured, loaded and executed. Thus, when the user has finished performing the desired function, the user may select a different user-selectable function. In the example shown in FIG. 5, the user selected the function of writing a letter 218. An appropriate operating system, such as a Windows® operating system is then configured, loaded and executed. An application program, such as Microsoft® Word® may then be executed so that the user can perform the selected function. In the example shown in FIG. 5, a word processing program, such as Microsoft® Word® is executed. The user interface for the word processing program 230 is displayed along with a button for displaying the task list 232 and a button for displaying the operating system list 234.

If the user presses the button for displaying the task list 232 or the button for displaying the operating system list 234, the logic returns to block 106 to display the appropriate portion of the user interface 200 so that the user can select a different function. In alternative embodiments, there is one function button (instead of one button for tasks 232 and one button for operating systems 234) that causes the entire user interface 200 shown in FIG. 4 to be re-displayed. Preferably, the logic of blocks 108–112 is repeated until the user shuts down the system.

The logic has been described in conjunction with a boot command, however it will be appreciated that the above logic can be performed at other times (e.g., in response to a command other than a boot command). For example, in alternate embodiments, the above logic may be executed prior to the issuance of a boot command. In yet other embodiments, the above logic may be executed in response to a user request, e.g., a user specified key sequence performed prior to the loading of the host-selected operating system 20.

We claim:

1. A disk drive for use with a computer system, the disk drive comprising:
   a. a host-accessible user partition including:
      i. a user partition address range;
      ii. a host-selected operating system stored within the user partition address range; and
      iii. a host-selected master boot record stored within the user partition address range, the host selected master boot record identifying the host-selected operating system;
   b. a host-inaccessible hidden partition independent of the host-accessible user partition and including:
      i. a hidden partition address range outside the user partition address range;
      ii. a drive-selected boot record stored within the hidden partition address range, the drive-selected boot record configured to load an instruction set capable of executing an application program having a user interface for accepting a user selection identifying the user-selectable function to be performed, to execute the application program, to accept the user selection identifying the user-selectable function to be performed, and to load an operating system configured to perform the user-selectable function; and
      iii. at least one drive-selected operating system configurable to perform at least one user-selectable function; and
   c. a disk controller configured to receive a command from the computer system to read the host-selected master boot record, and to send in place of the host-selected master boot record the drive-selected boot record to the computer system in response to receipt of the command.

2. The disk drive of claim 1, wherein the user interface is a graphical user interface.

3. The disk drive of claim 1, wherein the operating system configured to perform the user-selectable function is the drive-selected operating system.

4. The disk drive of claim 1, wherein the operating system configured to perform the user-selectable function is the host-selected operating system.

5. A computer system comprising:
   a. a disk drive including:
      i. a host-accessible user partition including:
         (1) a user partition address range;
         (2) a host-selected operating system stored within the user partition address range; and
         (3) a host-selected master boot record stored within the user partition address range, the host-selected master boot record identifying the host-selected operating system;
      ii. a host-inaccessible hidden partition independent of the host-accessible user partition and including:
         (1) a hidden partition address range outside the user partition address range; and
         (2) a drive-selected boot record stored within the hidden partition address range; and
      iii. a disk controller configured to receive a command from a host computer to read the host-selected master boot record, and to send in place of the host-selected master boot record the drive-selected boot record to the host computer in response to receipt of the command; and
   b. the host computer coupled to the disk drive and including:
      i. a host processor configured to generate the command to read the host-selected master boot record; and
      ii. a host memory configured to load the drive-selected boot record to define a loaded drive-selected boot record, after the disk drive receives the command;
      iii. the host processor configured to execute the loaded drive-selected boot record, the drive-selected boot record configured to load an instruction set capable of executing an application program having a user interface for accepting a user selection identifying the user-selectable function to be performed, to execute the application program, to accept the user selection identifying the user-selectable function to be performed, and to load an operating system configured to perform the user-selectable function.

6. The computer system of claim 5, wherein the user interface is a graphical user interface.

7. The computer system of claim 5, wherein the operating system configured to perform the user-selectable function is the drive-selected operating system.

8. The computer system of claim 5, wherein the operating system configured to perform the user-selectable function is the host-selected operating system.

* * * * *